United States Patent [19]
Lee

[11] Patent Number: 5,818,543
[45] Date of Patent: Oct. 6, 1998

[54] DIVERSITY RECEIVER FOR TELEVISION

[75] Inventor: Rowland N. Lee, Yorba Linda, Calif.

[73] Assignee: Premier Wireless, Inc., Livermoor, Calif.

[21] Appl. No.: 524,394

[22] Filed: Sep. 6, 1995

[51] Int. Cl.$^6$ ...................................................... H04N 5/44
[52] U.S. Cl. ...................... 348/725; 348/706; 455/277.1; 455/277.2
[58] Field of Search ................................... 348/706, 876, 348/725; 455/277.1, 133, 277.2; 343/876

[56] References Cited

U.S. PATENT DOCUMENTS

| | | |
|---|---|---|
| 4,434,440 | 2/1984 | Schiff . |
| 4,739,407 | 4/1988 | Mack et al. . |
| 4,814,882 | 3/1989 | Nuimura . |
| 4,926,498 | 5/1990 | Suzuki et al. ............................ 455/133 |
| 4,977,615 | 12/1990 | Suzuki et al. ............................ 455/277 |
| 5,128,969 | 7/1992 | Baghdady . |
| 5,140,610 | 8/1992 | Holliday et al. ............................ 375/1 |
| 5,233,424 | 8/1993 | Nuimura . |
| 5,303,396 | 4/1994 | Ooyagi et al. . |
| 5,313,660 | 5/1994 | Lindenmeier et al. . |
| 5,335,010 | 8/1994 | Lindemeier et al. . |
| 5,339,334 | 8/1994 | Baghdady . |
| 5,410,748 | 4/1995 | Hayashi . |

FOREIGN PATENT DOCUMENTS 7030472  1/1995  Japan ............................... H04B 7/87

Primary Examiner—Nathan J. Flynn
Attorney, Agent, or Firm—Oppenheimer Wolff & Donnelly

[57] ABSTRACT

A diversity receiver switches between at least two antennae when the noise level of a processed receiver signal exceeds a predetermined level. A diversity circuit extracts the noise from the receiver signal with a bandpass filter and compares the level of the noise to the predetermined level. When the noise exceeds the predetermined level, the diversity circuit sends a command signal to switching circuitry to switch from the antenna currently responsible for the receiver signal to another antenna. If the noise in the receiver signal indicative of the signal received by the now-coupled antenna still exceeds the predetermined level, then the switching circuitry continues to switch between antennae until an acceptable noise level is achieved. A sync separator circuit may be provided if antenna switching is desired during the vertical or horizontal blanking intervals. A plurality of antenna/receiver-circuit combinations may also be employed with the switching circuitry switching between the receiver circuit with a dedicated antenna rather than between the antennae themselves.

19 Claims, 4 Drawing Sheets

DIVERSITY RECEIVER FOR TELEVISION

BACKGROUND OF THE INVENTION

1. Field of the Invention

The present invention relates to receivers and, more particularly, to frequency-modulation (FM) receivers with more than one antenna and the capability to switch between antennae to improve signal quality.

2. Description of Related Art

The wireless transmission of video signals has widespread use in modern telecommunications. One common form of wireless transmission is television broadcasting which uses an amplitude-modulation (AM) transmission scheme. Another common form of wireless transmission is satellites. Satellite transmission uses a higher frequency than ground-based television transmission and often uses a frequency-modulation (FM) transmission scheme. Other transmission systems include microwave systems which also often use FM transmission schemes because of inherently better signal quality, higher sensitivity which means lower transmitted power, longer range, and better interference rejection.

Accompanying their respective transmission benefits, both AM and FM systems suffer from multi-path signal interference problems. As radio frequency signals such as FM signals are often reflected during propagation, a signal antenna at the receiver will receive several versions of the transmitted signal, each version having traveled over a different pathway. All of the signals are then added together at the receiving antenna. As some of the pathways are inevitably longer than others, the received signals will not be in phase. Adding several out-of-phase signals causes distortions in the combined received signal, that is, multi-path interference. This phenomenon results in a degraded received signal and, in extreme cases, a complete cancellation of the received signal.

In a fixed site installation (i.e., the receiver is not mobile), these multi-path problems can usually be solved by choosing the right antenna and positioning the antenna carefully. However, in mobile applications, the chance of encountering reflections is almost unavoidable. Some means of combating multi-path interference is necessary to maintain uninterrupted signal transmission. The circuitry used to overcome this problem usually resides on the receiving end in what is known as a diversity receiver.

Diversity receivers are common and have been in use for many years for voice and data communications. Many diversity receivers use more than one receiving antenna and are generally designed to switch to an alternate antenna when the received signal is bad or undesirable at the presently used receiving antenna.

In spatial diversity systems, two antennae are positioned apart with the intent that the reflected signals at the antenna locations will not cancel the desired signal at the same time. In polarity diversity systems, both horizontally and vertically polarized antennae are used with switching between the two for the better signal.

As it is often desirable to have mobile wireless links (including transmitting and receiving) such as those used in remote camera newscasts, multi-path interference is particularly difficult to solve in that changing antenna location or providing a directional antenna is not an alternative. Automatic gain control (AGC) is a process by which gain is automatically adjusted so that the output of a signal is substantially constant regardless of the range of variations at the input, and has been used in antenna switching. To do this, a switching command is usually derived from the automatic gain control of the receiver. However, the response time of most AGC circuits is slow and can be on the order of many tens of milliseconds or more, meaning that many milliseconds of signal could be lost before the connection is restored. For voice communication, a few milliseconds of silence may not be distractingly noticeable, but for video transmission, the loss of even a few milliseconds of the video signal means that the picture may roll or tear, which is distractingly noticeable to human vision. Therefore, the faster the switching scheme, the better.

One type of video diversity system is disclosed by U.S. Pat. No. 5,410,748 and is a system for regular television broadcast (i.e., AM) mobile applications. It uses multiple antennae and samples the video sync as the monitoring point to switch between the antennae at the vertical blanking intervals of the television signal. Another form of diversity receiver for television broadcasts is disclosed in U.S. Pat. No. 5,335,010. The video sync is monitored with antenna switching occurring at the horizontal blanking intervals. The diversity systems disclosed by these patents as well as other diversity systems known in the art are intended for regular television broadcast signals, while none of these systems provide acceptable solutions for multi-path interference for FM video systems.

Accordingly, as FM video diversity receivers are neither common nor widely available on the consumer market, it is an object of the present invention to provide a diversity receiver which minimizes multi-path interference problems, particularly in FM video systems.

SUMMARY OF THE INVENTION

A diversity FM receiver according to the present invention employs a plurality of antennae for receiving a transmission signal and providing an antenna signal indicative of the transmission signal to at least one receiver circuit. Each of the antennae has a different location from the other antennae. The receiver circuit is in communication with one of the antennae at one time for processing the antenna signal and providing a receiver signal, which may be a demodulated baseband signal in video applications, to an output of the diversity receiver.

The diversity receiver further includes a diversity circuit which also receives the receiver signal and extracts the noise component therefrom. The diversity circuit compares the level of the noise of the receiver signal to a predetermined level. When the noise level exceeds the predetermined level, the diversity circuit sends a command signal to a switching circuit. The switching circuit in turns switches from the antenna responsible for the receiver signal with the excess noise to another antenna.

One feature of the present invention is that the switching circuit may rapidly switch between the plurality of antennae to determine which of the antennae is providing the strongest antenna signal. Further, when the quality of the transmission signal is marginal, i.e., the noise of the receiver signal is at or near the predetermined level, the switching circuit may implement a "freeze" period between cycles so that picture flicker is reduced. An exemplary freeze period may be about 100 milliseconds.

Another feature of the diversity circuit of the present invention is that the switching circuit has a relatively short response time for one switching cycle. The diversity circuit uses a bandpass filter to extract the noise from the receiver signal. Accordingly, depending upon the bandwidth of the bandpass filter, the response time of the switching cycle may range from about a few microseconds to 100 microseconds.

One aspect of the diversity receiver of the present invention is that a synchronizing or sync signal separator is provided to separate the vertical or horizontal blanking signal of the video output to the diversity circuit. The diversity circuit then uses this signal as a reference so that the switching circuit switches between antennae during either the vertical blanking or horizontal blanking intervals of the video output signal.

The diversity receiver of the present invention has a further aspect in that a plurality of dedicated receiver circuits are provided, each respectively coupled to one of the antennae. A corresponding plurality of noise circuits are provided for extracting the noise signal from each of the respective receiver signals. A processing circuit compares the level of the noise of each receiver signal to the average level of the noise of all the receiver signals, and selects the receiver signal with the least noise either instantly or at the vertical or horizontal blanking interval, if desired.

Other aspects, features, and advantages of the present invention will become apparent to those skilled in the art from a reading of the following detailed description of the preferred embodiments with reference to the accompanying drawings.

DETAILED DESCRIPTION OF THE PREFERRED EMBODIMENTS

Figure 1:
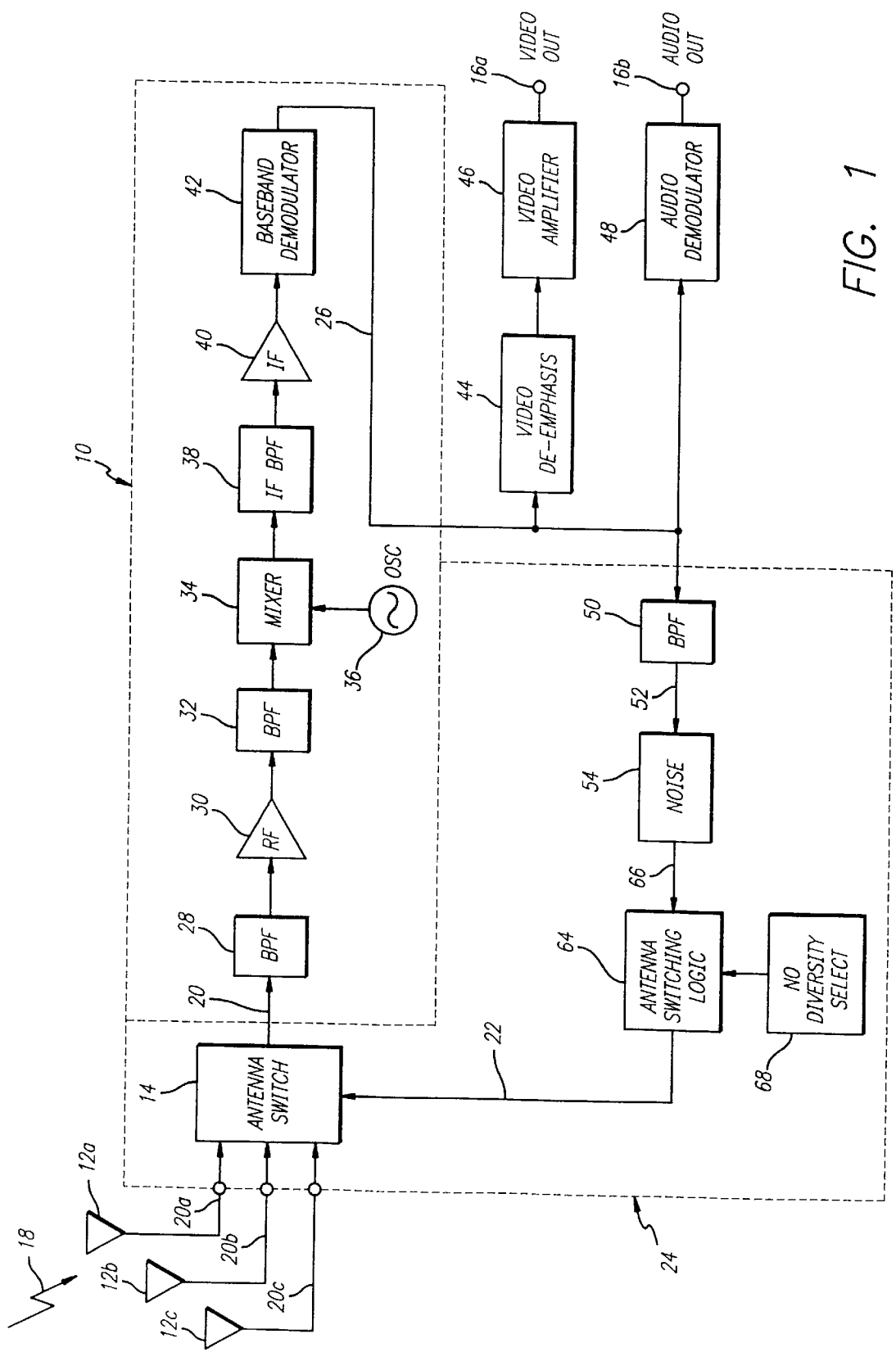
FIG. 1 is a block diagram of an exemplary embodiment of a diversity receiver illustrating principles of the present invention.

Referring to the drawings, exemplary embodiments of a diversity receiver according to the present invention are shown. Upon reading the following detailed description with reference to the drawings, those skilled in the art will recognize that various modifications of the diversity receiver not specifically shown or described herein will stem from the foundation provided by this description. However, rather than provide an exhaustive description of all possible preferred embodiments, Applicant exemplifies the principles of the present invention with only those embodiments illustrated by the attached drawings and elucidated by the following description.

Referring particularly to FIG. 1, a diversity receiver shown in an exemplary embodiment generally includes receiver circuitry 10 to which a plurality of antennae 12a, 12b, 12c are coupled via an antenna switch 14. In order to maximize the effectiveness of the diversity receiver, each antenna 12a–c has a different location from the other antennae 12, and although only three antennae 12a–c are shown in the exemplary embodiment, any number of antennae may be used for a particular installation, for example, a mobile installation. The antennae 12 are generally spaced one wavelength to several wavelengths apart from each other and are not necessarily in the same plane. The antennae 12 may be installed in a three-dimensional type of configuration to achieve maximum effectiveness in order to avoid all of the antennae 12 receiving a weak transmission signal simultaneously in, for example, high-frequency systems such as in the microwave band and above. For polarity diversity applications, two antennae 12 may be used and connected to two vertically and horizontally polarized antennae. A third antenna may be used, if desired, with a circularly polarized receive antenna.

The antenna switch 14 is preferably any fast-switching gallium arsenide (GaAs) switch or combination of switches. Alternatively, the antenna switch 14 may be PIN diode switches capable of sub-microsecond switching speeds. The form of the antenna switch 14 depends upon the number of antennae 12 employed in the diversity receiver; for example, the antenna switch 12 may be in the form of a single-pole two-throw radio-frequency (RF) switch for two antennae 12, a single-pole three-throw RF switch for three antennae 12, and so on.

The receiver circuitry 10 in combination with the antennae 12a–c may be configured to receive any type of transmission scheme, but it is preferable for the receiver circuitry 10 and antennae 12a–c to function as a normal frequency-modulation (FM) video receiver. Accordingly, the diversity receiver has a receiver output including a video output 16a and an audio output 16b in communication with the output of the receiver circuit 10.

Each of the antennae 12a–c receives a transmission signal 18 and provides to the antenna switch 14 a respective antenna signal 20a, 20b, 20c indicative of the transmission signal 18 received thereby. The antenna switch 14 provides the receiver circuitry 10 only one of the antenna signals 20a–c at any given time, which is shown generally as antenna signal 20. However, depending upon the quality of the antenna signal 20 provided the receiver circuitry 10, the antenna switch 14 switches away from the antennae 12a–c currently providing the antenna signal 20 to another one of the antennae 12a–c based upon a switching signal 22 generated by diversity circuitry 24, which will be discussed in more detail below.

Generally speaking, the antenna signal 20 is processed by the receiver circuitry 10 which provides a receiver signal 26 indicative of the antenna signal 20 to the receiver outputs 16a, 16b. The receiver circuitry 10 includes a bandpass filter 28 which receives the antenna signal 20 from the antenna switch 14. An RF amplifier 30 is coupled to the bandpass filter 28 to amplify the signal, which is received by another bandpass filter 32. The signal is then received by a mixer 34 coupled to a local oscillator 39.

In order to provide sufficient image separation, the signal is then received by an intermediate-frequency (IF) bandpass filter 38. The signal is then again amplified by an IF amplifier 40 which provides the signal to a baseband demodulator 42 from which the baseband receiver signal 26 is sent to the receiver outputs 16a, 16b. As the exemplary embodiment shown in FIG. 1 is designed for FM video transmission, the demodulated baseband receiver signal 26, which contains both the video and audio sub-carrier signals of the now-processed transmission signal 18 as well as a noise component, may be further processed by a video de-emphasis circuit 44 and a video amplifier circuit 46 for the video output 16a and by an audio demodulator 48 for the audio output 16b.

The diversity circuitry 24 further processes the demodulated baseband receiver signal 26 in order to determine if the noise in the receiver signal 26 provided the receiver outputs 16a, 16b exceeds a predetermined level. The diversity circuitry 24 includes a bandpass filter 50, for example, a narrow-band ceramic bandpass filter, which receives the receiver signal 26 and extracts therefrom a noise component 52. The bandwidth of the bandpass filter 50 may be in the range of hundreds of kilohertz to several megahertz. The wider the bandwidth, the faster the switching cycle. Further, the bandpass filter 50 may also be another type of ceramic, LC, or crystal bandpass structure having a bandwidth of a few kilohertz to several megahertz.

Figure 2:
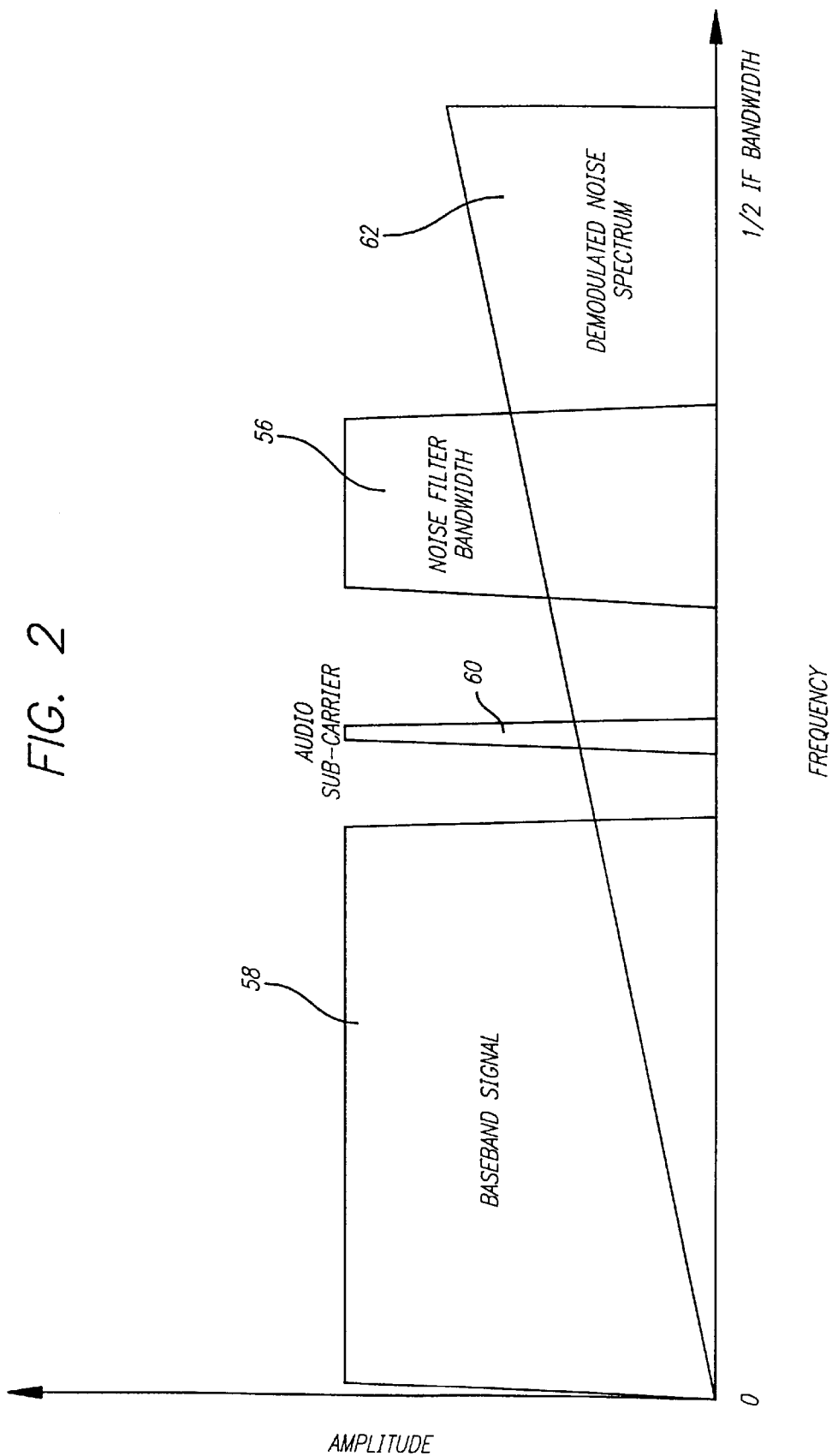
FIG. 2 is a graph of a frequency spectrum of a demodulated baseband signal in accordance with the principles of the present invention, particularly showing a noise filter bandwidth in comparison with the baseband signal.

With additional reference to FIG. 2, the center frequency of the bandpass filter 50 (which is represented by spectrum 56) may be anywhere in the spectrum or region between the highest video signal frequency of the baseband signal (shown by spectrum 58) and the audio sub-carrier frequency (spectrum 60), and may be about one-half of the bandwidth of the IF filter 38 of the receiver circuitry 10. Accordingly, the noise 52 is located in a region in which the video receiver signal 26 is quiet, i.e., not present.

Generally speaking, it is the nature of FM receivers that output noise (i.e., the level of the noise component 52) is inversely proportional to the input carrier level (i.e., the level of the antenna signal 20). Further, in FM receivers, noise increases rapidly when the input carrier is below a predetermined level, and the noise spectral density (in voltage scale) increases linearly with frequency at the demodulated baseband signal (as represented as the demodulated noise spectrum 62). Generally speaking, the diversity receiver of the present invention uses a higher frequency region for a higher noise output in the baseband receiver signal 26.

As the diversity receiver of the present invention uses noise as the monitoring element, it is not particularly important as to what type of signal is modulating the carrier or transmission signal 18 as long as the spectrum of the transmission signal 18 does not interfere with the noise spectrum at the baseband level. Therefore, the diversity receiver is not limited to video signals alone but is readily applicable to other wideband baseband signals such as digital data transmission, digitized video signal transmissions, and the like.

The bandpass filter 50 provides the noise 52 to a noise circuit 54. The noise circuit 54 includes circuitry for amplifying, rectifying, and filtering the noise 52 to smooth out fluctuations in the noise 52. The noise circuit 54 further includes circuitry for detecting the level of the noise component 52. When the level of the noise 52 exceeds a predetermined level, detection circuitry of the noise circuit 54 provides an antenna switching circuit 64 with a command signal 66. The predetermined level is preferably set according to the picture quality desired to be maintained at the video output 16a. The antenna switching circuit 64 includes timing and recycling circuitry which will be discussed in more detail below.

More specifically, when the antenna signal 20 received by the receiver circuitry 10 is fading, the noise level (i.e., the noise 52) in the receiver signal 26 received by the receiver outputs 16a, 16b rises instantly, as opposed to the slow rise in AM receivers. If the antenna signal 20 fades a substantial level, then the magnitude of the noise 52 will surpass the predetermined level, triggering the antenna switching circuit 64 to provide the switching signal 22 to the antenna switch 14. The antenna switch 14 then switches away from the antenna currently providing the antenna signal 20 to another one of the plurality of antennae 12.

Depending upon the strength of the transmission signal 18, it may be necessary for the antenna switching circuit 64 to cycle through the antennae 12a–c a number of times to arrive at the antenna with an acceptable signal. Depending upon the number of antennae 12 being used in the diversity receiver, each cycle may comprise one or more antenna switches, which will be discussed in more detail below. Under normal or strong transmission signal 18 conditions, a single switching between two antennae 12 is usually sufficient to restore a strong antenna signal 20 to the receiving circuit and, ultimately, to the receiver outputs 16a, 16b.

However, when the strength of the transmission signal 18 is marginal or at a weak level which yields a noise signal level at the predetermined switching level (for example, in long-range transmission), it is further preferable to have the antenna switching circuit 64 repeat the switching cycle of the antennae 12a–c with a "freeze" period between the repeated cycles. For example, if the freeze period is about 100 milliseconds, there will be less flickering in the picture at the video output 16a than if the antennae 12a–c were continuously cycled. This freeze period may be eliminated altogether if signal integrity is more important than the presence of a flickering picture, e.g., in the case of video signal processing applications. Furthermore, if the transmission signal 18 is so weak that the level of the noise component 52 almost continuously exceeds the predetermined level, then a no-diversity select switch 68 coupled to the antenna switching circuit 64 may be enabled to completely switch off any diversity action of the diversity circuitry 24.

The total response time for one switching cycle, depending upon the bandwidth of the bandwidth filter 50, may range from approximately a few microseconds to 100 microseconds; however, other switching-cycle response times are possible. This is equivalent to the duration of less than one line to two lines of the picture on a television screen, meaning that up to two lines of picture information could be lost in the transmission. This is a considerable improvement over the situation of losing a fraction of a second of picture if antenna switching were not initiated. To achieve shorter response times, the smoothing filter circuitry of the noise circuit 54 will have a higher cut-off frequency, which will result in a few more erratic command signals 66 due to noise spikes. A lower cut-off frequency in the smoothing circuitry of the noise circuit 54 will result in possibly longer than 100-microsecond response times so that more than two lines of the video signal will be lost which may, however, still be acceptable for normal viewing. Therefore, depending upon the longest response time allowable, the cut-off frequency of the noise filter 50 may be optimized to reduce the production costs of the filter.

Regarding the number of antenna switching in each cycle under margin transmission signal conditions, the antenna switching circuit 64 will switch between the antennae 12 seven times, for example, in a diversity receiver having two and three selectable antennae options. This ensures that a different antenna is selected after each cycle sequence with the intention that the newly selected antenna 12 provides a better antenna signal 20 than the previously connected antenna 12. The number of switches in a cycle may also apply to the following antenna configurations: one switch for two antennae 12, four switches for three antennae 12, five switches for four antennae 12, and so on.

Figure 3:
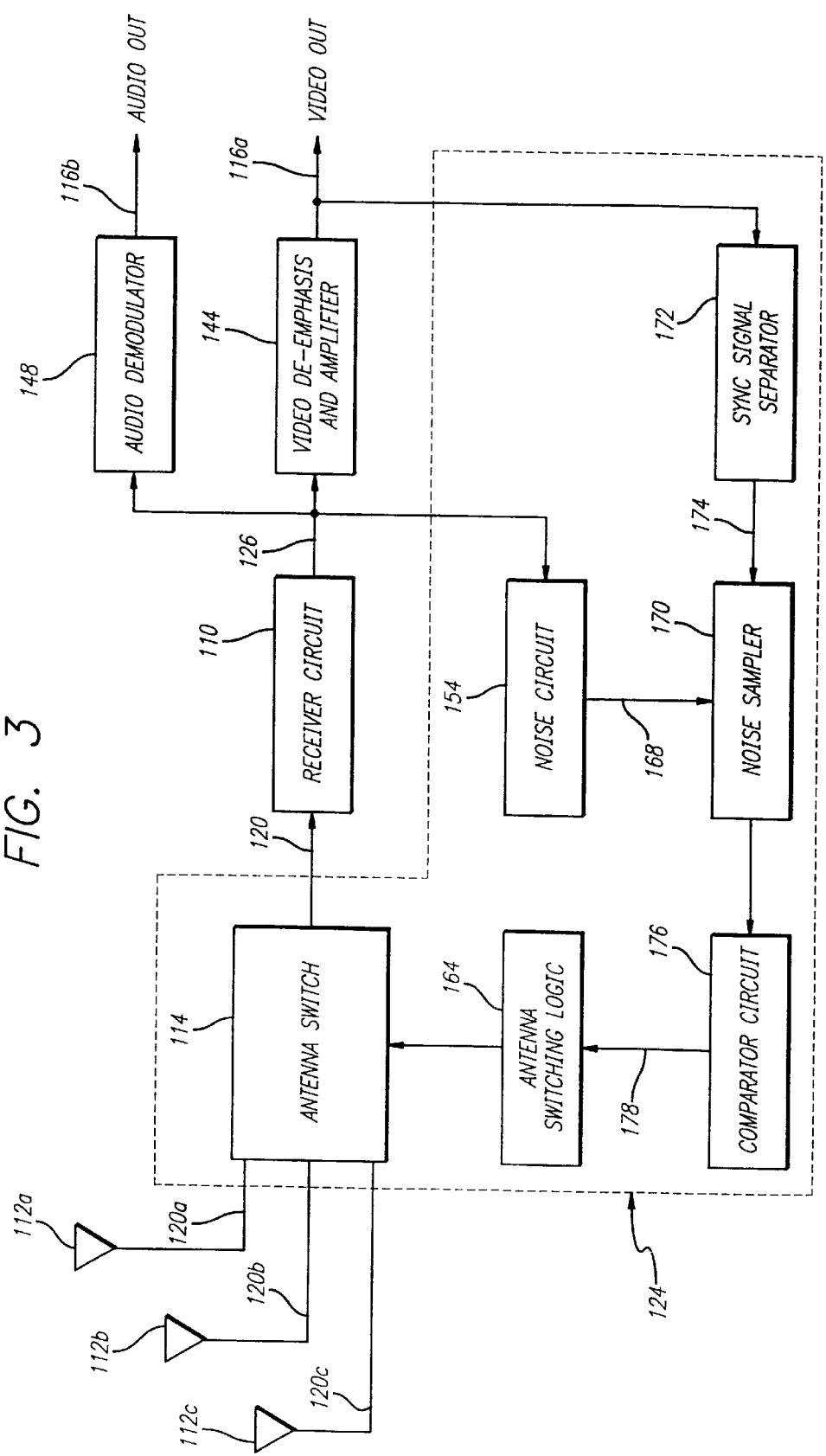
FIG. 3 is a block diagram of an exemplary embodiment of a diversity receiver illustrating further principles of the present invention, particularly showing a video diversity receiver which samples noise of the vertical and horizontal components of a video signal.

Referring to FIG. 3, another exemplary embodiment of a diversity receiver according to the present invention is shown. In this exemplary embodiment of the diversity receiver, elements which are analogous to elements in the exemplary embodiment shown in FIG. 1 have reference numerals with the prefix "1" added thereto. Accordingly, the description of these analogous elements will not be repeated herein.

In this exemplary embodiment, the receiver circuit 110 provides the demodulated baseband receiver signal 126 to the video and audio receiver outputs 116a and 116b and to the noise circuit 154. In this case, the noise circuit 154 does not provide a simple command signal but rather provides a filtered and shaped noise signal 168 to a noise sampling circuit 170. A synchronizing (sync) signal separator 172 is coupled to the video output 116a and provides the noise sampling circuit 170 with a vertical or horizontal blanking reference signal 174. The vertical blanking interval of a video display is when the trace returns to the top of the screen from the bottom of the screen, and the horizontal blanking interval is when the trace returns to the left side of the screen from the right. Accordingly, the diversity circuitry 124 of this diversity receiver samples the noise of the demodulated baseband signal 126 and switches between the antennae 112 during the vertical or blanking intervals of the signal at the video output 116a.

The noise sampling circuit 170 provides a noise signal of the receiver signal 126 during the blanking interval to a comparator circuit 176 which compares the level of this noise signal to a predetermined level. If the level of the noise signal exceeds the predetermined level, the comparator circuit provides the antenna switching circuit 164 with a command signal 178, thereby initiating a switching sequence as described above. Accordingly, the switching of the antennae 112a–c occurs only during one of the blanking intervals. This embodiment may also be altered to sample the noise from all of the antennae during the blanking intervals and to switch to the antenna with the lowest noise level.

Figure 4:
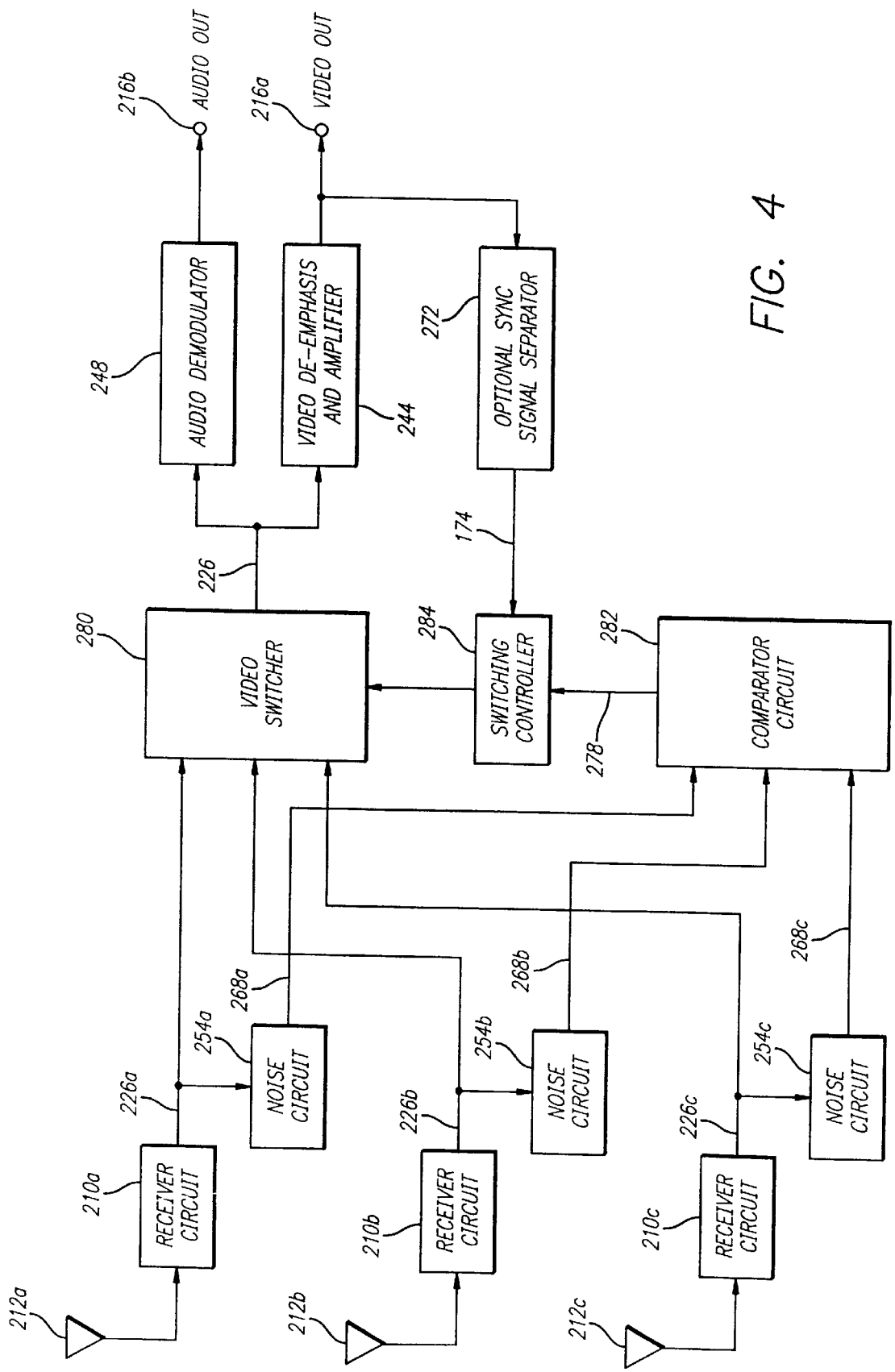
FIG. 4 is a block diagram of an exemplary embodiment of a diversity receiver having a plurality of antenna/receiver-circuit combinations, illustrating still further principles of the present invention.

Referring to FIG. 4, a further exemplary embodiment of a diversity receiver according to the present invention is shown. As was the case with the embodiment of FIG. 3, redundant description of elements analogous to those already presented will not be provided, which analogous elements have the prefix "2" added to the reference numeral thereof.

In this exemplary embodiment, a corresponding plurality of receiver circuits 210a, 210b, 210c are provided and coupled to the plurality of antennae 212a, 212b, 212c. Each of the receiving circuits 210a–c is preferably matched in amplitude, phase, and delay time. Further, each of the receiver circuits 210a–c provides a demodulated baseband receiver signal 226a, 226b, 226c to a video switch 280. The video switch 280 in turn provides only one of the receiver signals 226a–c to the video and audio outputs 216a, 216b, shown generally as signal 226. Also respectively receiving the receiver signals 226a–c is a corresponding plurality of noise circuits 254a, 254b, 254c which respectively provide a comparator circuit 282 with filtered and shaped noise signals 268a, 268b, 268c.

The comparator circuit 282 compares the level of the noise of each receiver signal 226a–c to the average level of the noise of all the receiver signals 226a–c, and selects the receiver signal 226 with the least noise level. In other words, when it the noise level of one of the receiver signals 226a–c is lower than the signal 226 currently received by the receiver output 216, the comparator circuit 282 provides a command signal 278 to a switching controller 284. The switching controller 284 in turn is coupled to the video switch 280 and switches away from the current receiver signal 226a–c received at the receiver output 216 to another receiver signal. An optional synchronizing (sync) signal separator 272 may be provided if switching during the vertical or horizontal blanking interval is desired as described above.

Although the embodiment diversity receiver of FIG. 4 would be more expensive than the previously described embodiments, if minimal signal drop out or if the quality of the signal at the receiver outputs 216 is to be maximized, this embodiment may be a viable diversity receiver for such applications in that there is almost no interruption in the video signal.

The foregoing description has focussed on exemplary embodiments which generally illustrate the principles of the present invention. However, as previously mentioned, from the foregoing teachings those skilled in the art will realize obvious modifications and variations of the diversity receiver. Accordingly, these modifications and variations are also within the principles of the present invention as defined by the appended claims.

What is claimed is:

1. A diversity receiver for receiving frequency-modulated (FM) video transmission signals, comprising:
    a plurality of antennae for receiving a frequency-modulated (FM) video transmission signal, each of said antennae having a different location from the other said antennae and outputting an antenna signal indicative of the FM video transmission signal;
    a receiver circuit capable of processing FM video transmission signals in communication with at least one of said antennae, said receiver circuit including an intermediate frequency (IF) bandpass filter with a bandwidth, said receiver circuit for receiving said antenna signal therefrom, for processing said antenna signal, and having an output which provides a receiver signal indicative of said antenna signal, said receiver signal including noise and a video signal;
    a receiver output in communication with the output of said receiver circuit for receiving said receiver signal;
    a diversity circuit including a noise bandpass filter for extracting the noise from said receiver signal, said diversity circuit for comparing the level of the noise to a predetermined level and for generating a command signal when the level of the noise exceeds said predetermined level, said diversity circuit having an output for providing said command signal; and
    switching circuitry coupled to the output of said diversity circuit for switching from the antenna responsible for said receiver signal at said receiver output upon receiving said command signal to another one of said antennae;
    said noise bandpass filter with a center frequency higher than the frequency of said video signal of said receiver signal and lower than one-half of said bandwidth of said IF bandpass filter.

2. The diversity receiver of claim 1 further comprising an antenna switch selectively coupled between said plurality of antennae and said receiver circuit and coupled to said switching circuit.

3. The diversity receiver of claim 1 wherein:
    said receiver output comprises a video output and an audio output; and
    said diversity receiver further comprises a sync signal separator coupled to said video output for separating a video blanking signal indicative of a video blanking interval of said receiver signal;

said diversity circuit providing said command signal during a video blanking interval; and said switching circuit switching between said antennae during the video blanking interval.

4. The diversity receiver of claim 1 further comprising a no-diversity select switch for disabling said switching circuit from switching.

5. The diversity receiver of claim 1 wherein said diversity circuit uses the noise of said receiver signal exclusively in generating said command signal.

6. The diversity receiver of claim 1 wherein said diversity circuit and said switching circuitry have a response time in switching from one of said antennae to another said antenna;

said response time being less than about 100 microseconds.

7. The diversity receiver of claim 1 wherein said receiver signal further includes an audio sub-carrier frequency;

said bandwidth of said noise bandpass filter being higher than said audio sub-carrier frequency of said receiver signal and lower than about one-half of said bandwidth of said IF bandpass filter.

8. A diversity receiver comprising:

a plurality of antennae for receiving a transmission signal, each of said antennae having a different location from the other said antennae and outputting an antenna signal indicative of the transmission signal;

a plurality of receiving circuits each respectively coupled to one of said antennae and having an output which provides a receiver signal indicative of said antenna signal received thereby, each of said receiving circuits for receiving said antenna signal from said antenna coupled thereto and for processing said antenna signal, said receiver signal including noise;

a receiver output in communication with the outputs of each of said receiver circuits for receiving said receiver signals;

a diversity circuit for extracting the noise from said receiver signals, comparing the level of the noise to a predetermined level, and having an output which provides a command signal when the level of the noise exceeds said predetermined level;

a switch coupled said receiver output and selectively coupled to said plurality of receiver circuits for receiving said receiver signals and providing only one of said receiver signals to said receiver output at one time, said switch being further coupled to switching circuit for switching from one of said receiver circuits to another one of said receiver circuits upon receiving said command signal;

said diversity circuit including:

a plurality of noise circuits each respectively coupled to the output of one of said receiver circuits for extracting the noise from a respective said receiver signal; and a comparator circuit for receiving the noise from each of said noise circuits, comparing the noise from each of said receiver signals to the average noise of all said receiver signals, and providing said command signal when the noise of one of said receiver signals is lower than the noise of the receiver signal being received by said receiver output.

9. A diversity switching method comprising the steps of:

receiving a frequency-modulated (FM) video transmission signal with a plurality of antennae each having a different location, each of the antennae providing an antenna signal indicative of the FM video transmission signal received thereby;

processing one of the antenna signals including filtering with an intermediate frequency (IF) filter to provide a receiver signal including a video signal with a frequency;

extracting the noise from the receiver signal in a frequency range higher than the frequency of said video signal and lower than about one-half of a bandwidth of said IF filter;

comparing the level of the noise to a predetermined level;

generating a command signal when the level of the noise exceeds the predetermined level; and switching from the antenna providing the antenna signal being processed to another antenna upon the generation of the command signal.

10. The method of claim 4 further comprising the step of:

extracting a sync signal from the receiver signal which is indicative of the vertical or horizontal video blanking intervals of the receiver signal; and wherein said switching step comprises the step of:

switching from the antenna providing the antenna signal being processed to another antenna upon the generation of the command signal and during a video blanking interval.

11. The method of claim 4 wherein said switching steps comprises the step of switching from the antenna providing the antenna signal being processed to another antenna upon the generation of the command signal continuously until the noise of the receiver signal is below the predetermined level.

12. The method of claim 4 wherein said command signal is generated exclusively using the noise of the receiver signal.

13. The method of claim 4 wherein said steps of extracting, comparing, generating, and switching collectively have a response time of less than about 100 microseconds.

14. The method of claim 4 wherein:

said processing step comprises the step of processing one of the antenna signals including filtering at an intermediate frequency (IF) frequency to provide a receiver signal with a video frequency and an audio sub-carrier frequency; and said extracting step comprises the step of extracting the noise from the receiver signal in a frequency range higher than said frequencies of said receiver signal and lower than about one-half of said IF frequency.

15. A diversity switching method comprising the steps of:

receiving a frequency-modulated (FM) video transmission signal with a plurality of antennae each having a different location, each of the antennae providing an antenna signal indicative of the FM video transmission signal received thereby;

processing one of the antenna signals to provide a receiver signal;

extracting the noise from the receiver signal;

comparing the level of the noise to a predetermined level;

generating a command signal when the level of the noise exceeds the predetermined level;

extracting a sync signal from the receiver signal which is indicative of the vertical or horizontal video blanking intervals of the receiver signal;

switching from the antenna providing the antenna signal being processed to another antenna upon the generation of the command signal and during a video blanking interval; and freezing for a predetermined period of time the switching between the antenna after a predetermined number of switches.

16. A diversity switching method comprising the steps of:

receiving a transmission signal with a plurality of antennae each having a different location, each of the antennae providing an antenna signal;

processing each of the antenna signals to provide a plurality of receiver signals;

providing one of the receiver signals to a receiver output;

extracting the noise from each of the receiver signals;

comparing the level of the noise of each receiver signal to the average of the levels of noise of all the receiver signals;

generating a command signal when the level of the noise of one of the receiver signals is lower than the noise of the receiver signal provided the receiver output; and switching to the receiver signal having the lower noise upon the generation of the command signal.

17. The method of claim 16 wherein said receiving step comprises the step of receiving an FM video transmission signal with a plurality of antennae each having a different location, each of the antennae providing an antenna signal.

18. The method of claim 17 further comprising the step of:

extracting a sync signal from the receiver signal which is indicative of the vertical or horizontal video blanking intervals of the receiver signal; and wherein said switching step comprises the step of:

switching to the receiver signal having the lower noise upon the generation of the command signal and during a video blanking interval.

19. A diversity switching method comprising the steps of:

receiving a frequency-modulated (FM) video transmission signal with a plurality of antennae each having a different location, each of the antennae providing an antenna signal indicative of the FM video transmission signal received thereby;

processing one of the antenna signals to provide a receiver signal;

extracting the noise from the receiver signal;

comparing the level of the noise to a predetermined level;

generating a command signal when the level of the noise exceeds the predetermined level;

switching from the antenna providing the antenna signal being processed to another antenna upon the generation of the command signal; and freezing for a predetermined period of time the switching between the antennae after a predetermined number of switches.

* * * * *